United States Patent
Stolbikov et al.

(10) Patent No.: US 12,500,765 B2
(45) Date of Patent: Dec. 16, 2025

(54) METHOD OF PROVIDING A SECURE ELECTRONIC DEVICE

(71) Applicant: LENOVO (SINGAPORE) PTE. LTD., Singapore (SG)

(72) Inventors: Igor Stolbikov, Apex, NC (US); Rod D Waltermann, Rougemont, NC (US); Scott Li, Cary, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 414 days.

(21) Appl. No.: 18/168,975

(22) Filed: Feb. 14, 2023

(65) Prior Publication Data
US 2024/0275596 A1    Aug. 15, 2024

(51) Int. Cl.
*H04L 9/32*  (2006.01)
*H04L 9/08*  (2006.01)

(52) U.S. Cl.
CPC .......... *H04L 9/3213* (2013.01); *H04L 9/0844* (2013.01); *H04L 9/3228* (2013.01)

(58) Field of Classification Search
CPC ... H04L 9/3213; H04L 9/0844; H04L 9/3228; H04L 63/0807; H04L 9/0841; H04L 9/32; H04L 63/0853; G06F 21/335
See application file for complete search history.

(56) References Cited

U.S. PATENT DOCUMENTS

| | | | | |
|---|---|---|---|---|
| 2003/0084311 A1* | 5/2003 | Merrien | .................. | G06Q 20/02 713/191 |
| 2010/0281252 A1* | 11/2010 | Steeves | .................... | G06F 21/72 713/155 |
| 2015/0269566 A1* | 9/2015 | Gaddam | ............... | G06Q 20/385 705/67 |
| 2017/0142090 A1* | 5/2017 | Mahaffey | ............... | H04L 63/083 |
| 2018/0375663 A1* | 12/2018 | Le Saint | ............... | H04L 9/3247 |
| 2022/0206885 A1* | 6/2022 | Tarren | .................. | G06F 11/0709 |

OTHER PUBLICATIONS

Li, Chunqiang ("Li," Machine Translation CN 101436930, published on May 20, 2009, pp. 1-35) (Year: 2009).*
Marcos Portnoi et al. "Location-Enhanced Authenticated Key Exchange," 2016, pp. 1-5. (Year: 2016).*
Mohammed Alzormai et al., "The Mobile Phone as a Multi OTP Device Using Trusted Computing," 2010, pp. 75-82 (Year: 2010).*

* cited by examiner

*Primary Examiner* — Luu T Pham
*Assistant Examiner* — Canh Le
(74) *Attorney, Agent, or Firm* — Dean D. Small; The Small Patent Law Group, LLC

(57) ABSTRACT

A system for activating an electronic device is provided. The system includes an electronic device configured to generate an activation token that is based on a one-time public key and an electronic device private key using a Diffie-Hellman protocol. The system also includes a service server configured to generate a service token using the Diffie-Hellman protocol in response to receiving the activation token. The system also includes a third-party server configured to generate third-party service provider token using the Diffie-Hellman protocol based on the activation token. The one or more processors of the electronic device validate the service token and the third-party service provider token, and in response to validating the service token and third-party service provider token, activate the electronic device.

16 Claims, 4 Drawing Sheets

METHOD OF PROVIDING A SECURE ELECTRONIC DEVICE

FIELD

The present disclosure relates generally to a method and system for enhanced security for an electronic device delivered to a customer.

BACKGROUND OF THE INVENTION

As electronic devices become more and more integrated into people's day to day lives, numerous measures have been created to enhance the security of electronic devices. Electronic devices are typically kept in secure locations, such as warehouses, and shipped via safe channels of commerce.

Still, currently, electronic devices are often shipped without any protection for the electronic device being stolen and/or used by an unauthorized party. It allows a bad actor to install malware during the transit or device to be stolen, reimaged, and used. Manufacturers have attempted to address this issue by utilizing key-based security to verify an electronic device that has been delivered to a customer has not been compromised.

However, customers desire more control over the delivery of the electronic device. The problem is to support securely activating devices without exposing or compromising the cryptographic keys. Accordingly, a need remains for a method to allow for a collaborative activation process of a delivered electronic device that maintains proof of ownership and allows other trusted parties to initiate activation without exposing the security system to nefarious individuals.

SUMMARY

In accordance with embodiments herein, a system for activating an electronic device is provided. The system includes an electronic device that has one or more processors, and a memory storing program instructions accessible by the one or more processors. Responsive to execution of the program instructions the one or more processors are configured to generate an activation token that is based on a one-time public key and an electronic device private key using a Diffie-Hellman protocol. The system also includes a service server that has one or more processors, and a memory storing program instructions accessible by the one or more processors. Responsive to execution of the program instructions, the one or more processors are configured to generate a service token using the Diffie-Hellman protocol in response to receiving the activation token. The system also includes a third-party server that has one or more processors, and a memory storing program instructions accessible by the one or more processors. Responsive to execution of the program instructions, the one or more processors are configured to generate third-party service provider token using the Diffie-Hellman protocol based on the activation token. The one or more processors of the electronic device validate the service token and the third-party service provider token, and in response to validating the service token and third-party service provider token, activate the electronic device.

Optionally, to generate the at least one activation token includes utilizing a service public key and the electronic device private key. Alternatively, to generate the at least one activation token includes utilizing a customer public key and the electronic device private key. In one aspect, generating the activation token includes utilizing a timed one-time password (TOTP). In another aspect, the one or more processors of the service server are configured to determine the service token to determine a service private key and an electronic device public key. Optionally, the one or more processors of the service server are configured to communicate the service token to the electronic device. In one example, the one or more processors of the third-party server are configured to communicate the third-party service provider token to the service server. In another example, the one or more processors of the service server are configured to communicate the third-party service provider token and service token to the electronic device. In yet another example, the electronic device utilizes the Diffie-Hellman protocol to validate the service token and the third-party service provider token.

In one or more embodiments, a method for activating an electronic device for use by an individual is provided. Under control of one or more processors of an electronic device configured with executable instructions, the method includes generating at least one activation token utilizing a timed one-time password (TOTP) that includes a one-time public key and an electronic device private key and communicating the activation token to a service server. Under the control of one or more processors of the service server, the method also includes generating a service token in response to receiving the activation token and communicating the service token and activation token to a third-party server. Under the control of one or more processors of the third-party server, the method additionally includes generating a third-party service provider token in response to the receiving the activation token and the service token. Under the control of the one or more processors of the electronic device, the method includes validating the server token and the third-party service provider token, and in response to validation, activating the electronic device.

Optionally, generating the service token includes utilizing a service public key and the electronic device private key. In one aspect, generating the at least one activation token includes utilizing a customer public key and the electronic device private key. In another aspect, generating the at least one activation token includes utilizing the TOTP that includes a one-time public key, and an electronic device private key utilizing a Diffie-Hellman protocol. In yet another aspect, the one or more processors of the electronic device utilize a Diffie-Hellman protocol to generate the at least one activation token. In one example, the one or more processors of the service server utilize the Diffie-Hellman protocol to generate the service token. In another example, the one or more processors of the third-party service utilize the Diffie-Hellman protocol to generate the third-party service provider token. In yet another example, the method also includes, under the control of the one or more processors of the service server, communicating the service token and third-party service provider token to the electronic device.

In one or more example embodiments, a computer program product is provided that comprises a non-transitory computer readable storage medium comprising computer executable code to generate at least one activation token utilizing a timed one-time password (TOTP) that includes a one-time public key and an electronic device private key and communicate the activation token to a service server. The code is also configured to receive a response token from the service server in response to the communicating of the activation token to the service server and validate the response token to activate the electronic device.

Optionally, the response token includes a service token and a third-party service provider token. In one aspect, the response token is generated utilizing a Diffie-Hellman protocol, the third-party service provider token is generated utilizing the Diffie-Hellman protocol, and the response token is validated utilizing the Diffie-Hellman protocol.

DETAILED DESCRIPTION

Figure 1:
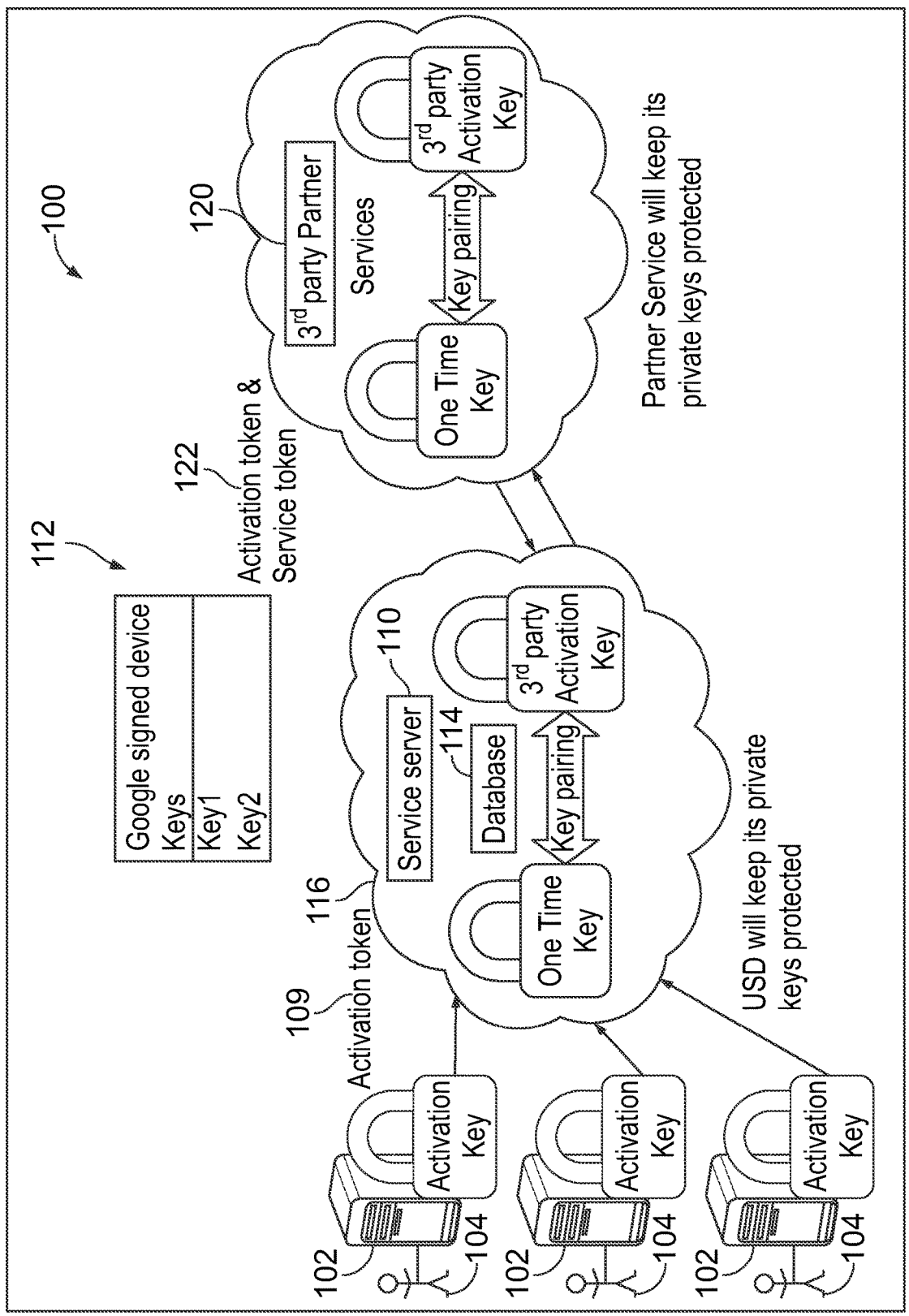
FIG. 1 illustrates a schematic view of a system for securing an electronic device in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

TERMS

The term "timed one-time password" or "TOTP" refers to refers to a randomly generated password that is only produced a single time, and for a limited, or determined amount of time. The password may comprise numbers, letters, symbols, or the like. The password may or may not contain a word. As an example, a first password may be ki8ynens0?j, and a second password may be n85the0##j%. So, the word "the" happens to be present in the second password, but a word does not have to be presented. The TOTP can be only letters, only numbers, only symbols, or the like. The password can contain four digits, six digits, ten digits, twenty digits, one-hundred digits, two-hundred and fifty-six digits, etc. The password also only is presented for a determined period of time. That period of time can be thirty seconds, one minute, two minutes, five minutes, ten minutes, or the like. After the determined period terminates, the password expires, and can no longer operate as a password for obtaining a secret. In some examples, after the determined period expires, a new TOTP is generated for use for another determined period of time.

The term "key" when used herein refers to an encrypted piece of data, information, or the like utilized to conceal a secret. A private key refers to an encrypted key that is kept secret from others. The private key may be kept secret as a result of the encryption being provided on an electronic device that is specific to the electronic device during the manufacturing process. The private key may be secret as a result of an encryption occurring after the manufacturing process. A public key refers to a piece of data, information, or the like utilized for decryption of the private key. The public key may be provided to a customer, held by a manufacturer, etc. A private key and public key form pairs for concealing, and obtain the piece of data, information, etc. that is kept secret through the encryption process.

The term "token" as used herein refers to a small portion of an electronic device that allows for the exchange of data, information, or the like with another electronic device. A token may include encryptions, passwords, decryptions, public key, private keys, or the like for authenticating the token as being from a known source. As an example, an activation token can include private keys, public keys, or the like for authenticating that an electronic device has not been tampered with, altered, modified, changed, etc. after leaving a manufacturer. The activation token allows activation of the electronic device without concern that firmware, malware, etc. has been placed on the electronic device before reaching a consumer. If a token cannot be authenticated, then the electronic device cannot be activated and operated.

The term "protocol" as used herein refers to a set of systems and rules for providing keys for the encryption and decryption of secrets utilizing a public channel to establish a mutual secret between two parties without the secret being transferred over the Internet of Things. Example protocols can include a Diffie Hellman (DH) protocol, quantum computing key encapsulation mechanism (KEM), super-singular elliptic curve isogenies, or the like.

The term "real time" as used herein shall mean at the same time, or a time substantially contemporaneous, with an occurrence of another event or action. For the avoidance of doubt, as an example, when a search is requested by a user and relevant resources are provided in real-time in response to the search, the relevant resources are received by the user within a few seconds of the search.

OVERVIEW

A method is provided for customers receiving a new electronic device, like a laptop computing device, to utilize activation tokens for operating the electronic device for the first time. By requiring the use of the activation tokens, a customer is ensured that the electronic device was not stolen, tampered with, or otherwise during transportation of the electronic device from the manufacture in route to the customer. When initially activated, the electronic device generates the activation tokens using a timed one-time password (TOTP) and an extended triple Diffie-Hellman (X3DH) protocol that establishes a shared secret key between the electronic device and at least two servers. In this manner, the electronic device generates a one-time electronic device public key, a service public key, a customer public key, and an electronic device private key. At a service server remote from the electronic device, a service token is calculated that includes a service private key, and an electronic device public key that is communicated to the electronic device. A third-party server can also be utilized over a network to provide a third-party service provider token that is validated by the new electronic device along with the service token. Each of the service token and the third-party service provider token are generated utilizing the Diffie-Hellman protocol, such that validation by the electronic device is the result of the Diffie-Hellman protocol being utilized at three different devices (the electronic device, service server, and third-party server). A customer can then validate these activation tokens (service token and third-party service provider token) to activate the electronic device accordingly.

FIG. 1 illustrates a system 100 for activating an electronic device 102 upon receipt of the electronic device by a customer 104. The electronic device 102 can be a laptop computer, central processing unit (CPU), desktop computer, smartphone, smartwatch, Tablet, smart TV, or the like.

The electronic device 102 can include components such as one or more processors (e.g., a microprocessor, microcomputer, application-specific integrated circuit, etc.), one or more local storage medium (also referred to as a memory), a user interface which includes one or more input circuits and one or more output circuits, a power module, a component interface, an infrared transmitter receiver and one or more wireless transceivers. All of these components can be operatively coupled to one another, and can be in communication with one another, by way of one or more internal communication links, such as an internal bus.

The local storage medium can store information related to an activation application (FIG. 2) utilized to initially activate the electronic device 102 upon receipt of the electronic device 102 by the customer 104. The information can include instructions for determining, generating, forming, etc. activation tokens 109. As an example, an activation token can be formed using a timed one-time password (TOTP) and a shared electronic device secret key. The TOTP has a limited or determined amount of time before the password expires and is no longer useable. In one example, the determined time is one minute, while in other examples the determined time can be thirty seconds, two minutes, five minutes, ten minutes, or the like. Still, the TOTP must be inputted by a customer 104 in real-time prior to the end of the determined period, otherwise the password will not be valid.

In one example, the electronic device uses the activation application that includes instructions to use a X3DH protocol that establishes the different TOTP public keys and the shared secret electronic device key. The activation application may also include instructions for receiving public or private keys and communicating with at least one service server 110. The activation tokens 109 can include a TOTP associated with an elliptic-curve Diffie-Hellman (ECDH) protocol to provide the one-time public key, and an electronic device private key. The activation tokens can also include a TOTP associated with an ECDH protocol to generate a service public key, and the electronic device private key of a service token 111. The activation token 109 can further include a customer public key, and the device private key utilizing an ECDH protocol to form a customer token.

The service server 110 in one example is remote from the electronic device 102 and is part of a cloud environment 112 that can also include a cloud database 114 related to the electronic device 102 of the customer. In another example, the service server 110 is maintained by the manufacturer and is configured to communicate with plural electronic devices 102 over a network 116. The network 116 can be a wide-area network (WAN), Bluetooth, utilize base stations and nodes, be a cellular communication network, mesh network, or the like. The service server 110 can also include one or more processors configured to calculate the service token 111 to include a service private key and include an electronic device public key. In this manner, the service server 110 generates a service token 111 that includes keys that when paired with the activation token generated by the electronic device 102 can cause decryption of the private keys to allow activation, and use of the electronic device. In one example, the service token 111 is generated utilizing a DH protocol.

In one example, a third-party server 120 can also be utilized over the network 116 to provide a third-party service provider token 122 to the service server 110. To this end, the third-party server 120 also can include one or more processors with instructions to perform the functions of the third-party server. In one example, the third-party service provider token 122 is generated utilizing a DH protocol. By including a third-party authentication key (e.g., third-party service provider token 122), an extra layer of security is provided. In this manner, to attempt to override the security associated with the service token 111 and third-party service provider token 122, both an individual associated with the service server 110 and an individual associated with the third-party server 120 would have to breach the security associated with the activation token 109 and third-party service provider token 122. Once the third-party service provider token 122 is provided back to the electronic device 102 of the customer 104, the customer can validate the activation tokens, including, the service token, customer token, and/or the third-party service provider token 122.

In one example, a customer 104 can take one of the one-time public keys and generate an activation token that is an ephemeral token. The one-time public key is immediately disposed of after the use. In addition, the ephemeral token can be generated as a ECDH (e.g., one-time public key, electronic device private key). The ephemeral token can then be included in the TOTP and/or X3DH schema to generate activation tokens 109 that include a TOTP formed as a one-time public key, and an electronic device private key; a TOTP formed as a service public key and an electronic device private key for the service server 110; and a TOTP formed as a customer public key and an electronic device private key. The activation tokens 109 can then be sent to the third-party server 120 that calculates the TOTP for a third-party service provider private key and an electronic device public key as a third-party service provider token 122 to pass to the customer along with the service token 111. The customer 104 can then verify the service token 111 and the third-party service provider token 122. The customer can respond to the third-party service provider with a similar sequence that allows both service server 110, and the third-party server 120 to confirm the validation.

Figure 2:
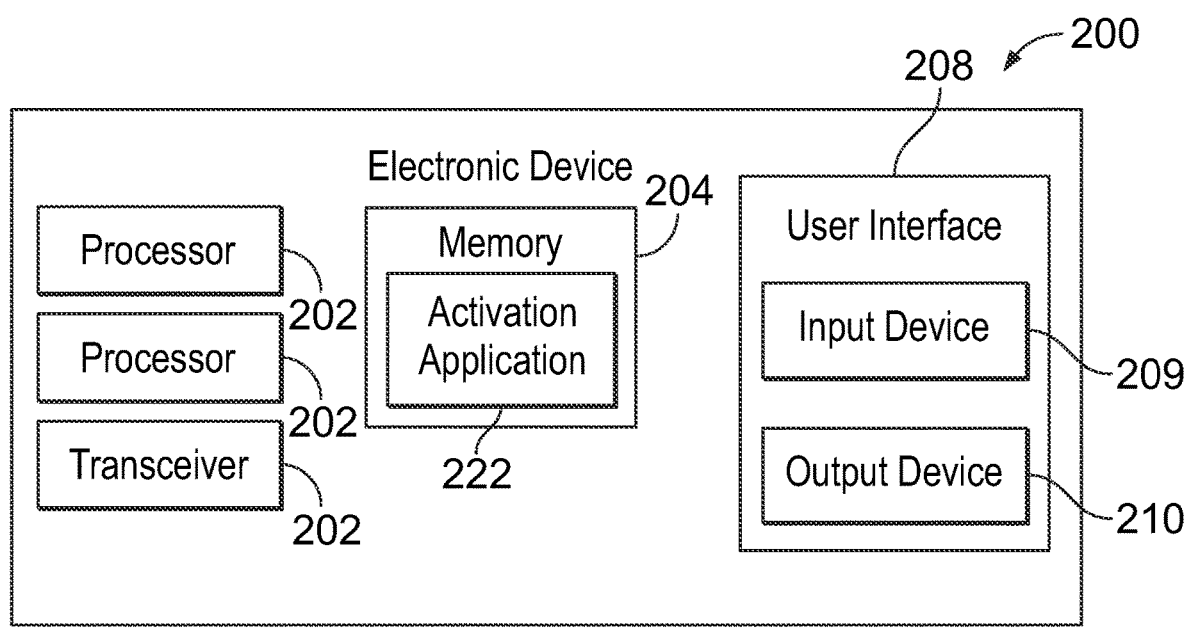
FIG. 2 illustrates a schematic view of an electronic device in accordance with embodiments herein.

FIG. 2 illustrates a simplified block diagram of an electronic device 200. The electronic device 200 can be the electronic device of the customer of FIG. 1, the service server of FIG. 1, or the third-party server of FIG. 1. In one example, the electronic device is the electronic device of the customer and includes security protocols for initial activation. The electronic device 200 includes components such as one or more processors 202 (e.g., a microprocessor, microcomputer, application-specific integrated circuit, etc.), one or more local storage medium (also referred to as a memory portion) 204, and one or more transceivers 206.

The local storage medium 204 can encompass one or more memory devices of any of a variety of forms (e.g., read only memory, random access memory, static random access memory, dynamic random access memory, etc.) and can be used by the one or more processors 202 to store and retrieve data. To this end, in one example when the electronic device is an electronic device of a customer, the local storage medium includes an activation application 222 utilized by a customer when first using the electronic device 200 after purchase. The activation application communicates via the one or more transceivers 206 to a cloud, or service server associated with the manufacturer of the electronic device 200. The service server can communicate with the transceivers to calculate and determine public and private keys utilizing a TOTP of the electronic device to ensure that the electronic device has not been previously activated. To this end, the service server can communicate with a third-party provided to further develop the public and private keys associated with the TOTP to access the electronic device 200 and verify the customer as the user in real-time.

The electronic device 200 in one embodiment also includes a user interface 208 that is configured to communicate with a network resource. The user interface 208 can include one or more input devices 209 and one or more output devices 210. The input and output devices 209, 210 may each include a variety of visual, audio, and/or mechanical devices. For example, the input devices 209 can include a visual input device such as an optical sensor or camera, an audio input device such as a microphone, and a mechanical input device such as a keyboard, keypad, selection hard and/or soft buttons, switch, touchpad, touch screen, touch screen keyboard, icons on a touch screen, a touch sensitive areas on a touch sensitive screen and/or any combination thereof. The screen may be touch sensitive to various types of touch and gestures. In one example, the input device 209 may be a keyboard, mouse, mouse pad, touch screen, or the like. The input device 209 may be utilized to provide public key information, or other security information associated with the initial use of the electronic device 200.

Figure 3:
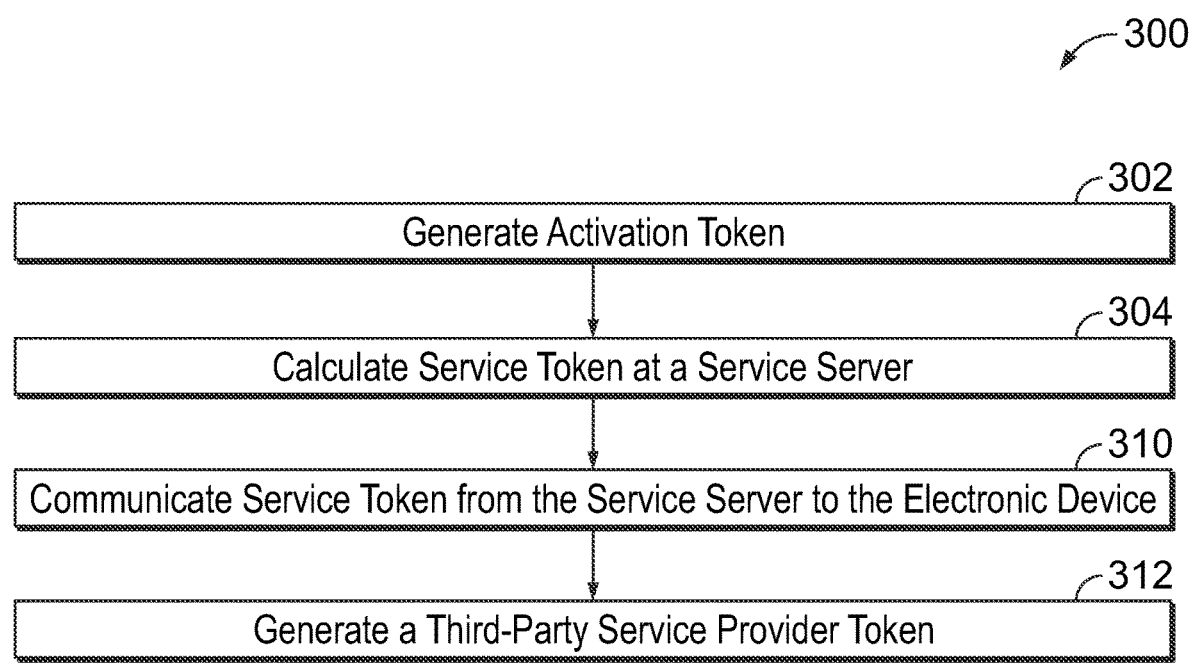
FIG. 3 illustrates a block flow diagram of a method for activating an electronic device, in accordance with embodiments herein.

FIG. 3 illustrates a schematic block flow diagram of a method 300 for generating token utilized for activating an electronic device. In one example, the block flow diagram is considered to perform algorithms of an electronic device, service server, and/or a third-party server. To this end, the method can be performed by any of the electronic devices, systems, etc. described in relation to FIGS. 1-2. In one example, at least one of the electronic device is an electronic device that has been purchased on-line and is being shipped from a manufacturer to a user, or customer.

At 302, the one or more processors of the electronic device generates one or more activation tokens. In one example, the electronic device utilizes a TOTP in association with an X3DH protocol to generate a one-time public key, and an electronic device private key. The TOTP in one example embodiments can be a random six-digit number generated and lasting five minutes before a new, different random six-digit number is provided. The TOTP is then utilized to form the one-time public key, and the electronic device private key.

At 304, the one or more processors of a service server generates a service token in response to receiving the activation token of the electronic device. In one example, a DH protocol is utilized to generate the service token. The one or more processors of the service server generates the service token (e.g., response token) by calculating the service token associated with the service server. The service token of the service server can utilize the TOTP with a ECDH to provide the service token that includes a service private key, and an electronic device public key.

At 310, the one or more processors of the service server then communicates with a third-party server to provide the activation token and the service token to the third-party server. Then, at 312, the third-party server can generate a third-party service provider token. In one example, a DH protocol is utilized to generate the third-party service provider token. In this manner, both the service token and third-party service provider token can be utilized to validate the electronic device.

Figure 4:
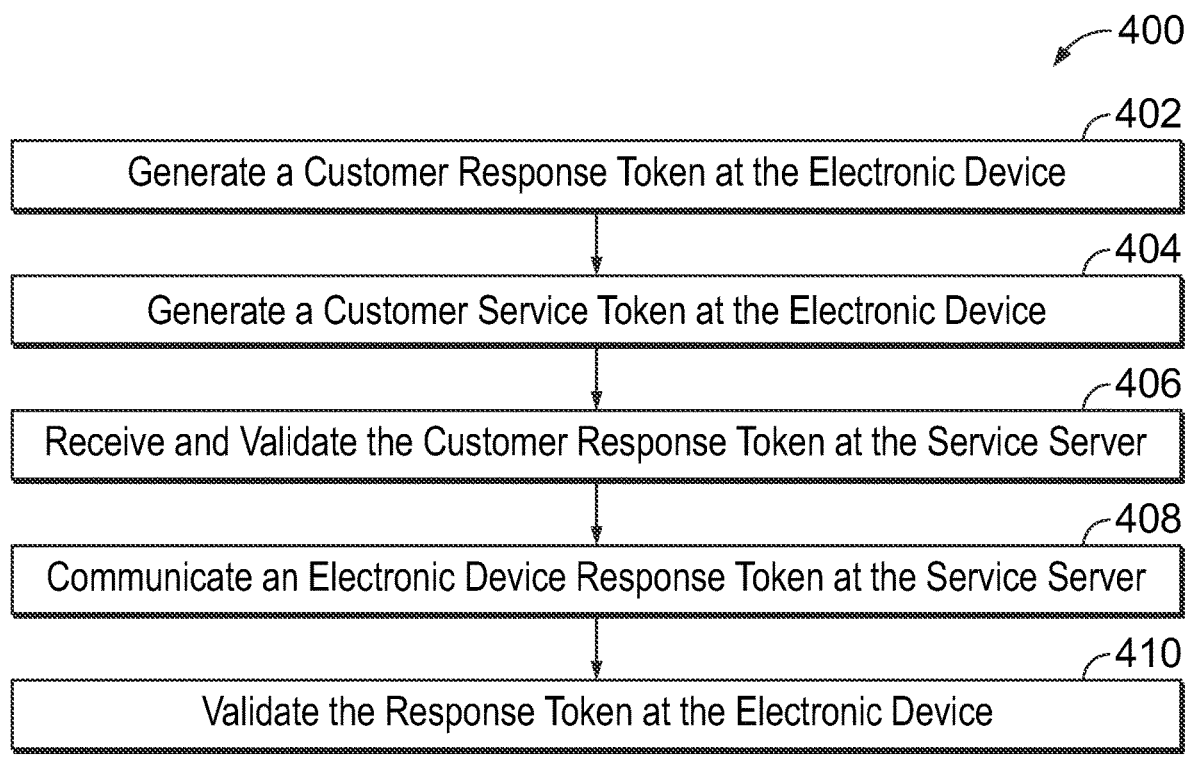
FIG. 4 illustrates a block flow diagram of a method of validating an electronic device, in accordance with embodiments herein.

FIG. 4 illustrates a schematic flow block diagram of a method 400 for a customer to verify activation of an electronic device. In one example, the flow block diagram is considered a response algorithm that can be performed by the electronic device and/or remote server, such as a service server, of the electronic device. The electronic device can be any of the electronic devices described in relation to FIGS. 1 and 2 and may be implemented by the system and electronic devices illustrated in FIGS. 1 and 2. Additionally, the service server, and the one or more processors of the service server in one example is the service server described in relation to the system of FIG. 1.

At 402, the one or more processors of the electronic device, in response to customer activation, generates an activation token that can be considered a customer response token. In one example, a TOTP is used with an ECDH to form a one-time private key along with an electronic device public key that is considered an activation code. At 404, the one or more processors of the electronic device, as a result of customer activation, generate a customer service token. In one example, a TOTP is utilized with an ECDH to form a customer private key, and a service public key to provide an activation code.

At 406, the one or more processors of the service server receives and validates the customer service token, while passing the customer response token to a third-party server. At 408, the one or more processors of the service server also generates a service token. In one example, the service token is formed as a TOTP using an ECDH to generate a service private key and an electronic device public key with a response token. In response, the third-party server generates a third-party service provider token, that in one example is generated utilizing a DH protocol. The third-party service provider token can be provided to the service server to communicate back to the electronic device.

At 410, the one or more processors of the electronic device validate the server token and third-party service provider token in real-time by matching the tokens to the service public key and electronic device private key, along with the one-time public key and electronic device private key with the activation codes. Thus, after completion of this challenge-response, the electronic device is activated for use. By using tokens that are generated by two separate servers using DH protocols, and additional layer of security is provided, causing enhanced safety for activation of an electronic device by a user.

CLOSING STATEMENTS

Before concluding, it is to be understood that although e.g., a software application for undertaking embodiments herein may be vended with a device such as the system 100, embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A system for activating an electronic device, comprising:
an electronic device comprising:
one or more processors;
a memory storing program instructions accessible by the one or more processors, wherein, responsive to execution of the program instructions, the one or more processors perform the following:
generate at least one an activation token related to activating the electronic device utilizing a timed one-time password (TOTP) that includes a one-time public key and an electronic device private key using a protocol;
communicate the activation token to a service server;
the service server comprising:
one or more processors;
a memory storing program instructions accessible by the one or more processors, wherein, responsive to execution of the program instructions, the one or more processors perform the following:
generate a service token related to activating the electronic device using the protocol in response to receiving the activation token, and communicating the service token and activation token to a third-party server; and
the third-party server comprising:
one or more processors;
a memory storing program instructions accessible by the one or more processors, wherein, responsive to execution of the program instructions, the one or more processors perform the following:
generate a third-party service provider token in response to the receiving the activation token and the service token related to activating the electronic device using the protocol based on the activation token;
wherein the one or more processors of the electronic device validate the service token and the third-party service provider token; and
in response to validating the service token and third-party service provider token, activate the electronic device based on the service token and the third-party service provider token;
wherein generating the at least one activation token includes utilizing a customer public key and the electronic device private key.

2. The system of claim 1, wherein to generate the at least one activation token includes utilizing a service public key and the electronic device private key.

3. The system of claim 1, wherein the one or more processors of the service server are configured to determine the service token to determine a service private key and an electronic device public key.

4. The system of claim 3, wherein the one or more processors of the service server are configured to communicate the service token to the electronic device.

5. The system of claim 1, wherein the one or more processors of the third-party server are configured to communicate the third-party service provider token to the service server.

6. The system of claim 1, wherein the one or more processors of the service server are configured to communicate the third-party service provider token and service token to the electronic device.

7. The system of claim 1, wherein the protocol is a Diffie-Hellman protocol and the electronic device utilizes the Diffie-Hellman protocol to validate the service token and the third-party service provider token.

8. A method for activating an electronic device for use by an individual comprising:
under control of one or more processors of an electronic device configured with executable instructions;
generating at least one activation token related to activating the electronic device utilizing a timed one-time password (TOTP) that includes a one-time public key and an electronic device private key;
communicating the activation token to a service server;
under the control of one or more processors of the service server, generating a service token related to activating the electronic device in response to receiving the activation token, and communicating the service token and activation token to a third-party server;
under the control of one or more processors of the third-party server, generating a third-party service provider token in response to the receiving the activation token and the service token; and
under the control of the one or more processors of the electronic device, validating the service token and the third-party service provider token, and in response to validation, activating the electronic device based on the service token and the third-party service provider token;
wherein generating the at least one activation token includes utilizing a customer public key and the electronic device private key.

9. The method of claim 8, wherein generating the service token includes utilizing a service public key and the electronic device private key.

10. The method of claim 8, wherein generating the at least one activation token includes utilizing the TOTP that includes a one-time public key, and an electronic device private key utilizing a Diffie-Hellman protocol.

11. The method of claim 8, wherein the one or more processors of the electronic device utilize a Diffie-Hellman protocol to generate the at least one activation token.

12. The method of claim 11, wherein the one or more processors of the service server utilize the Diffie-Hellman protocol to generate the service token.

13. The method of claim 12, wherein the one or more processors of the third-party service utilize the Diffie-Hellman protocol to generate the third-party service provider token.

14. The method of claim 8, further comprising, under the control of the one or more processors of the service server, communicating the service token and third-party service provider token to the electronic device.

15. A computer program product comprising a non-transitory computer readable storage medium comprising computer executable code to:
generate at least one activation token related to activating an electronic device utilizing a timed one-time password (TOTP) that includes a one-time public key and an electronic device private key;
communicate the activation token to a service server;
generate a service token related to activating the electronic device in response to receiving the activation token, and communicating the service token and activation token to a third-party server;

generate a third-party service provider token in response to the receiving the activation token and the service token;

receive a response token related to activating the electronic device from the service server in response to the communicating of the activation token to the service server; and validate the response token to activate the electronic device based on the service token and the third-party service provider token;

wherein generating the activation token includes utilizing a customer public key and the electronic device private key.

16. The computer program product of claim 15, wherein the response token is generated utilizing a Diffie-Hellman protocol, the third-party service provider token is generated utilizing the Diffic-Hellman protocol, and the response token is validated utilizing the Diffie-Hellman protocol.

* * * * *